July 22, 1924.
N. E. MORGAN
ELECTRICAL DENTAL MACHINE
Filed Dec. 8, 1920
1,502,435
3 Sheets-Sheet 3
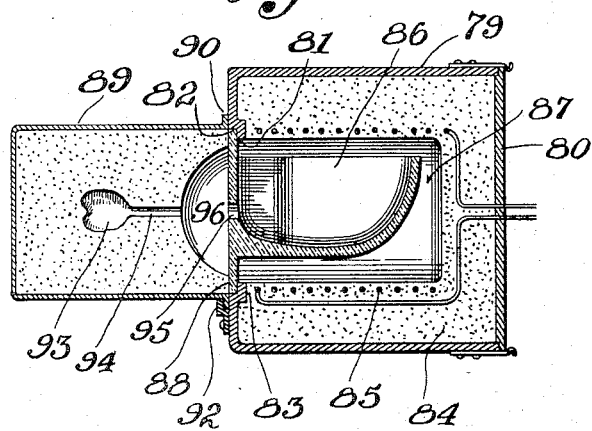
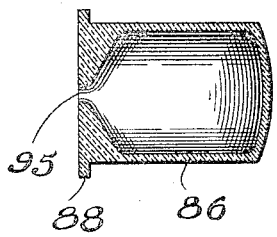
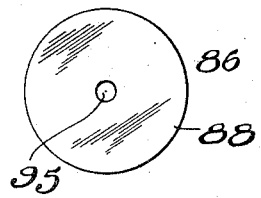
Inventor
N. E. Morgan
By Mason Fenwick Lawrence,
Attorneys Patented July 22, 1924.

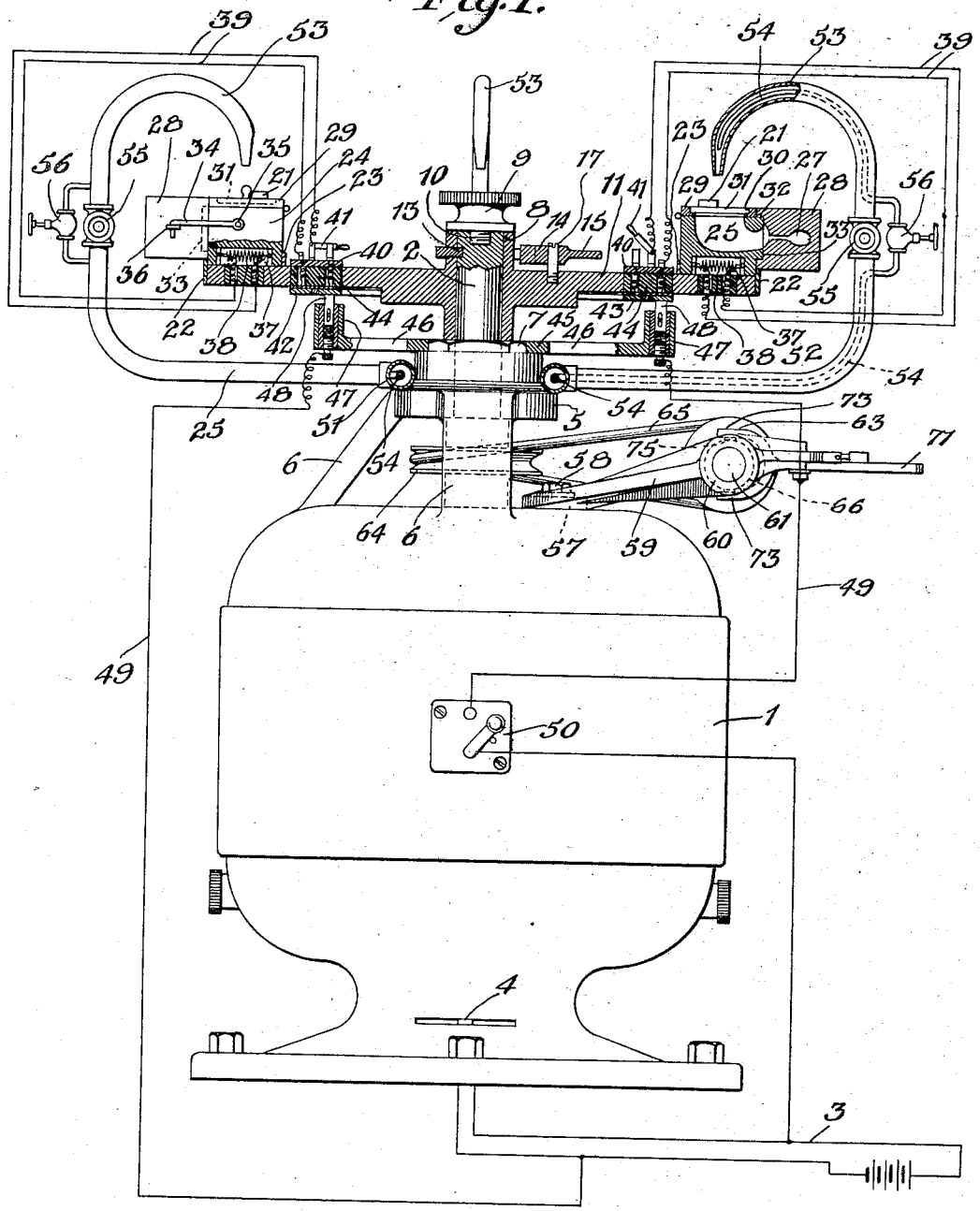

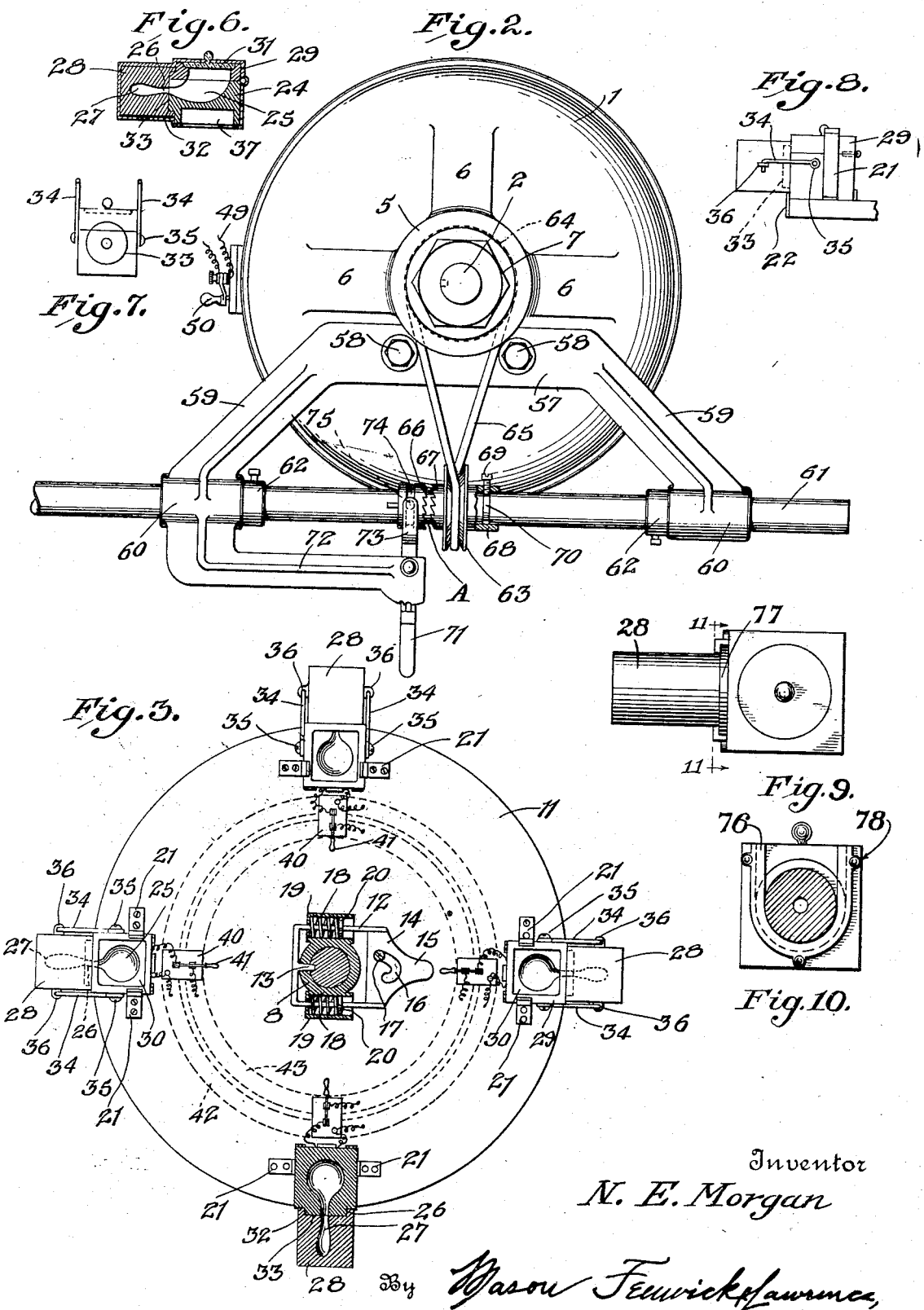

1,502,435

UNITED STATES PATENT OFFICE.

NUMA ERVIN MORGAN, OF ATLANTA, GEORGIA.

ELECTRICAL DENTAL MACHINE.

Application filed December 8, 1920. Serial No. 429,222.

*To all whom it may concern:*

Be it known that I, NUMA E. MORGAN, citizen of the United States, residing at Atlanta, in the county of Fulton and State of Georgia, have invented certain new and useful Improvements in Electrical Dental Machines; and I do hereby declare the following to be a full, clear, and exact description of the invention, such as will enable others skilled in the art to which it appertains to make and use the same.

This invention relates to new and useful improvements in electrical dental machines and more particularly to a device which is applicable to an electric motor, such as the standard upright motor and wherein the several parts of the apparatus are readily attachable or detachable to the motor. The main object of the present invention is the provision of an electrical dental appliance wherein the molding of crowns, plate work and the like is carried out through means of centrifugal force.

Another object of the present invention is the provision of an electrical dental apparatus which includes the provision of an electric motor wherein various operations in the dental art can be carried out through power derived from the motor, the several operating parts being connected to the drive shaft of the motor and arranged so that while some of the parts are in operation, the other parts will remain idle.

Another object of the present invention is the provision of an electrical dental apparatus including a motor having a table mounted upon the shaft of the motor and detachably connected thereto, said table carrying a plurality of electric heaters for the purpose of melting metal, said heaters being provided with suitable heating means whereby the heaters can be heated during the rotation of the table and the heaters being provided with molds attached thereto for receiving the molten metal which will conform to the shape of the mold through the centrifugal force upon the rotation of the table.

A further object of the present invention is the provision of an electrical dental apparatus wherein means is included for heating metal and molding the same through centrifugal force and additional means is provided for operating a dental lathe or instruments of the like character.

A further object of the present invention is the provision of a dental apparatus including an electric motor having a rotatable table attached to the shaft thereof and provided with suitable clutch mechanism whereby the table can be disconnected from the shaft, and a further provision of means for heating metal deposited within suitable receptacles carried by the table.

With the above and other objects in view, the invention consists in the novel features of construction, the combination and arrangement of parts hereinafter more fully set forth, pointed out in the claims and shown in the accompanying drawings, in which—

Figure 1 is a side elevation of a motor, illustrating my improved apparatus attached thereto, parts thereof being broken away and illustrated in cross-section, Figure 2 is a top plan view with the table removed, Figure 3 is a plan view of the table, showing the electrical connections to the heaters and one of the heaters and molds as well as the central portion of the table being cut away and illustrated in cross-section.

Figure 4 is a detail perspective view, illustrating the gas heater which can be used in place of the electric heater, Figure 5 is a plan view of the means which supports the electrical brushes, parts of the same being broken away, Figure 6 is a longitudinal sectional view, through one of the heaters and molds, Figure 7 is a front elevation of the same, Figure 8 is a side elevation of the mold and heater.

Figure 9 is a top plan of a modified form of connection between the mold and crucible, and Figure 10 is a transverse section of the line 11—11 of Figure 9.

Figure 11 is a longitudinal sectional view taken through an improved form of mold, crucible and heating means.

Fig. 12 is a horizontal sectional view of the crucible illustrated in Fig. 11;

Fig. 13 is an end elevation of the crucible.

Carrying out my invention, I desire to employ an upright motor as illustrated in Figure 1, but it is to be understood that the several operating parts can be applied equally as well to any standard make of motor. This motor 1 is provided with a shaft 2 and is controlled through the means of an electric circuit 3, having a switch member 4 to control the current to the motor. From this, it will be apparent that the motor can be operated at will by controlling the switch member 4.

Mounted upon the shaft 2 at a suitable distance above the motor 1, is an annulus 5, to which are attached the upper ends of the arms 6, said arms having their lower ends secured to the body of the motor to thus support the annulus 5 in spaced relation with the motor upon the shaft. Mounted upon the shaft above the annulus is a hexagonal nut 7 and enclosing the upper end of the shaft 2 is a sleeve 8, which is arranged above the nut 7 and secured into position by means of the thumb nut 9, having a threaded stem 10 adapted to be engaged within the upper end of the shaft whereby to retain the sleeve 8 in its respective position upon the upper end of the shaft 2.

Formed integral with the sleeve 8 is a table member 11, which can be either rotated with the shaft or remain idle while the shaft is moving and in order to accomplish this result, a suitable clutch mechanism is provided which includes the U-shaped member 12, having an inwardly projecting lug 13 formed upon its central portion and adapted to project through an opening in the sleeve 8 and engage within a recess formed in the shaft 2, whereby to connect the sleeve 8 with the shaft when so desired. The outer ends of the arms of the member 12 are connected by means of a plate 14 having a handle 15 and further provided with an arcuate slot 16, one end of which extends into the plate opposite the handle a suitable distance beyond the other end of the slot and engaged within this slot is a pin 17 adapted to be disposed in either end of the slot so that the projection 13 may be either engaged or disengaged with the shaft 2.

In order to assure the definite engagement of the projection 13 with the recess in the shaft 2, suitable coil springs 18 are provided which are mounted within the casings 19 at opposite sides of the shaft 2 and adapted to encircle the side portions of the member 12. Secured to the side portions of the member 12 are the plates 20, which are adapted to bear against the ends of the coil springs 18, the tension of said springs forcing the projection 13 into the recess of the shaft 2, whereby to suitably connect the sleeve 8 with the shaft and when this is done, the pin 17 will be in the farther end of the slot 16. When it is desired to disengage the projection 13 from the recess in the shaft 2, the handle 15 is grasped and the member 12 moved longitudinally to disengage the pin 17 from the lower end of the slot 16 to the shorter end, whereby the projection 13 will be retained from engagement with the recess in the shaft 2.

In Figure 3, I have illustrated the manner of applying the heaters or crucibles to the plate 11. It will be noted in the present illustration, that they are disposed at diametrically opposite points upon the plate and securely attached thereto by means of the brackets 21. The crucibles are further retained in position by having their outer ends engaged by the annular flange 22 formed upon the plate 11 and their inner ends engaged with the upstanding plates or lugs 23, carried by the plate 11. Each of the crucibles constitute a body member 24 having a cavity 25 formed therein for the reception of the metal or other material to be melted and extends outwardly from one end of the body into a contracted neck portion 26 communicating with the orifice 27 in the mold 28. From this, it will be apparent that after the metal has been melted within the cavity 25, the plate 11 is rotated, the centrifugal movement throwing the molten metal from the cavity 25 through the contracted neck portion 26, into the mold orifice 27, where it will conform to the shape of the cavity within the mold.

The mold is provided with a hinged cover portion 29 having a central opening 30 forming communication with the cavity 25, which is normally closed by means of the cover plate 31.

The molds 28 are connected to the crucibles 24 by having their inner ends thereof provided with an annular recess 32, adapted to receive the reduced end portion 33 of the crucibles and these molds are securely retained in position with respect to the crucibles by means of the hook members 34 disposed upon opposite sides of the crucible and pivotally secured thereto by means of the pins 35, the outer ends of the said hooks being engaged with suitable eyelets 36 to retain the molds in their operative positions, as clearly illustrated in Figures 1 and 3.

The crucibles 24 are provided within their bottom portions with suitable cavities 37 in which the heating coils 38 are arranged to heat the metal contained within the cavities 25. These coils are suitably connected by means of the wires 39 to the annular plate 40 which is mounted upon the table 11, one of said wires being connected to the plate 40 through the medium of the knife switch 41, whereby the electrical current from the coils 38 can be readily cut off when desired. The plate 40 is connected to the plates 42 and 43 by means of suitable connecting wires, said plates being arranged on the under side of the table 11 directly beneath the plate 40 and the connections between the plates 42 and 43 and the plate 40 are insulated from the metallic plate by means of suitable insulating plugs 44, arranged with openings provided therefor in the table 11 and adapted to entirely enclose the connections between the plates.

Mounted upon the hexagonal nut 7 is an annulus 45 having oppositely disposed arms 46 carried thereby, the outer ends of said arms being provided with sockets 47 in which the brushes 48 are mounted, said brushes being connected to the source of supply through the wires 49, one of said wires leading through the switch 4, which will control the rotation of the table 11. From this, it will be apparent that when the circuit is closed by means of the switch 50, a source of electrical supply will be communicated to the brushes 47, which in turn will supply a current of electricity to the heating coils 38 through the medium of the wires 39.

Should it be found desirable to use gas as a heating medium in place of electricity, I provide suitable means for supplying the gas for heating the metal within the cavities 25 of the crucibles and to this end the means include a circular pipe 51, which is mounted upon the annulus 5 and provided with radially projecting arms 52, which extend outwardly from beneath the table 11, thence upwardly and provided with a curved upper end as shown at 53 and terminating into a burner directly above the cavity 25. In order to supply a suitable quantity of air to mix with the gas, a tube 54 is arranged within each of the pipes 52 and extends upwardly and projects from the pipe at a point below the regulating valve 55. This air tube extends around the valve 55 and then enters the pipe again and terminates at a point removed from the end of the burner to supply a suitable quantity of air to be mixed with the gas from the pipes 52. The supply of air is controlled by means of a valve member 56 arranged within each one of the tubes 54. From this, it will be apparent that by connecting the ring 51 with a suitable source of supply of gas and air, sufficient heat can be produced to melt the metal within the crucibles 24 and it will also be apparent that should the current of electricity be insufficient to heat the metal 25 to the proper degrees, gas can be used to provide an additional supply of heat.

From the above, it will be readily apparent that when it is desired to heat the metal before depositing the same within the mold orifice 27, the metal is deposited within the cavities 25 of the crucibles and the switch 50 is operated to supply a current of electricity to the heating coils 38 through the wires 49 and 39 and through the medium of the plates 40, 42 and 43 and it will be apparent that should it be desired to use only one or more of the crucibles, the crucibles not in use can be cut off from the supply of electricity by operating the individual switch members 41.

After the metal within the crucibles has been heated to a molten condition, the switch 50 can be operated to cut off the heating current and the switch 4 operated to impart motion to the motor 1, which in turn will operate the shaft 2 and rotate the table 11 with sufficient speed whereby the centrifugal force will throw the molten metal into the mold orifices 27 while the metal is still in its molten state. If it is desired to allow the coils 38 to remain heated during the centrifugal movement, the switches 41 and 50 will remain closed and as the brushes 48 are arranged in contact with the plates 42 and 43, a continuous supply of current will be supplied to the coils 38 during the rotation of the table 11, so that it will assure the removal of all particles of the molten metal from the cavity 25, during the rotation of the table, as it is desired to deposit within the cavities 25 only sufficient metal to cover the outline of the mold within the orifice 27. Therefore it is necessary that all of the metal within the cavities 25 be removed during the centrifugal movement of the plate 11.

While I have shown and described my improved electrical dental apparatus as particularly adapted for use in molding crowns, plates and the like through said centrifugal movement, it is to be understood that my improved device can be used equally as well for operating dental lathes and other machinery applicable to the art and in carrying out this feature of the invention, a suitable bracket is secured to the top of the motor 1 and includes a longitudinal bar member 57 which is bolted or otherwise secured to the top of the motor by means of the screw bolts 58. Projecting radially from each end of the bar 57 and preferably at an angle, are the arms 59 having sleeves 60 formed at the outer ends thereof for the purpose of supporting a shaft 61. The shaft 61 is securely held in place within the sleeve bearing 60 by means of the collars 62 which are secured to the shaft 61 adjacent the inner ends of the sleeves 60. The shaft 61 derives its power through the medium of a pulley 63 mounted upon the shaft and connected to the pulley 64 on the shaft 2 of the motor by means of the belt 65. As clearly illustrated in Figure 2, this pulley 63 is loosely mounted upon the shaft 61 and rotates independent of the shaft, but should it be desired to impart movement to the shaft 61, the clutch member 66 which is keyed to the shaft 61 will be engaged with the clutch member 67 carried by the pulley 63, whereby movement will be imparted to the shaft 61 when these two clutch faces 66 and 67 are engaged with each other.

The pulley 63 is carried by a sleeve 68 adapted to embrace the shaft 61 and arranged within the sleeve is a removable pin 69 adapted to have its inner end engaged within an annular groove 70 formed in the shaft 61, whereby to prevent longitudinal movement of the sleeve 68 upon the shaft 61 and to provide independent rotary movement for the pulleys 63 with respect to the shaft 61. The clutch member 66 is keyed to the shaft 61 and adapted to rotate therewith and in order to operate this clutch member 66 to engage the same with the clutch 67, a suitable lever 71 is pivotally mounted upon the end of the arm 72, which in turn is integrally connected with one of the sleeves 60. The inner end of the lever 71 is provided with two spaced arms 73 arranged upon opposite sides of the grooves 74 within the clutch member 66 and provided with guide pins 75 at their outer ends adapted to be disposed within this groove 74 whereby, through movement of the lever 71, the clutch member 66 can be moved longitudinally upon the shaft 61 and at the same time rotate freely with the shaft.

It will be understood that should it be desired to operate the shaft 61, the table 11 can be allowed to remain stationary by disengaging the projection 13 from the shaft 2 and engaging the clutch member 66 with the clutch member 67 whereby the shaft 61 can be rotated and the table 11 allowed to remain stationary and it will be understood that both the table 11 and the shaft 61 can be operated simultaneously if so desired. It is the main object of my invention to provide an electrical dental apparatus which can not only be used for melting and molding metals, but wherein several articles can be operated from the same source of motive power, such as a dental lathe and various equipments particularly adapted for use in the dental art.

In Figures 10 to 11, I have illustrated the modified form of means for detachably connecting the molds to the crucible and in this construction, a flange 76 is provided substantially U-shaped in form and spaced from the end of the mold to provide a guideway for the annular flange 77 which is formed on the mold 28. The flange member 76 is provided at intervals with perforated ears 78, whereby the flange can be readily attached to the end of the crucible and securely held in position. From this, it will be noted that the mold 28 can be readily secured to the crucible for receiving the molten contents of the crucible upon rotation of the table 11 by inserting the flange 77 in the guide-way formed by the flange 76 and as this flange 77 is to be fitted tightly within the guide-way, the friction between the end of the crucible and the end of the mold will prevent the mold from moving upwardly within the guide-way during the rotation of the table 11. However, any suitable form of fastening means may be used, if so desired, to securely hold the mold in position with respect to the crucible during the rotation of the table.

In Figure 11 I have illustrated a slightly modified form of the crucible and the manner of heating the same which includes a casing 79 having a removable end piece 80 which may be secured in position in any desired manner and provided on its opposite end with an opening 81 having its edges offset to provide the annular shoulder 82 and a flange 83 arranged adjacent the shoulder, forming a substantially annular seat. The casing 79 is filled with a suitable form of material formed from a plastic composition and illustrated at 84 and arranged within this material is the heating element 85 which in the present instance includes the wires 7 which are wound around a thin matrix of material and a conductive of heat. The wires 85 lead outwardly through the detachable end portion 80 of the casing to the source of supply whereby heat may be readily supplied to the wires 85 for heating the contents of the crucible 86 which is mounted within the chamber 87 formed in the body of the material 84.

The chamber 87 which is formed in the body 84 is of substantially the same size as the opening 81 in the end of the casing 79 and the crucible 86 is arranged within this chamber for supporting the metal to be heated in position within the chamber, the outer end of said crucible being provided with an annular flange 88 which is adapted to be arranged within the seat formed by the shoulder 82 in the flange 83.

The crucible 86 is retained in position by having the flask 89 abutting against the flange 88, said flask having an annular flange 90 removably arranged with a channel member 91 secured to the front wall of the casing 79.

Arranged within the flask 89 is the mold material 92 having the form 93 formed therein, said form having a passage 94 which extends outwardly toward the open end of the flask and is disposed in direct alinement with the opening 95 formed in the end of the crucible 86. It will be noted that at the end of the mold there is formed a space 96 disposed between the end of the passage 94 and the opening 95 whereby to receive any excess metal from the crucible 86 upon filling the mold form 93.

From this it will be apparent that the mold illustrated in Figure 11 which includes the casing 79, the crucible 86 arranged with the casing and the detachable flask 89 secured to the end of the casing can be readily arranged upon the table 11 and disposed in such a position that the heating element 85 will readily receive a supply of electricity from the means operating the table so that the contents of the crucible 86 can be readily heated and conveyed into the mold form 93 upon rotation of the table.

From the above description, it will be noted that I have provided an efficient device of the character set forth, whereby metals of various characters can be heated to a molten condition within the crucible and upon rotation of the table 11 thrown by centrifugal force into a suitable mold attached to each of the crucibles and while I have shown and described this device as particularly adapted for use in connection with dental machines, it is apparent that the same can be used equally as well by jewelers, plumbers or by anybody who desires to melt and cast metal in a mold through means of centrifugal force.

What I claim is:

1. A dental machine comprising an electric motor having a vertically extending shaft, a turn-table mounted thereon, a clutch positioned between said shaft and turn-table, a plurality of molds carried by said turn-table, and alternate means whereby gas or electricity may be used to heat said molds.

2. A dental machine comprising an electric motor having a vertically extending shaft, a turn-table mounted thereon, a second shaft arranged at right angles to said motor shaft and means connected with said motor shaft for rotating said second shaft.

3. A dental machine comprising an electric motor having a vertically extending shaft, a turn-table mounted thereon, a bracket carried by said motor, a shaft rotatably mounted in said bracket and means connecting said motor shaft with said last mentioned shaft for rotating the same.

4. A dental machine comprising an electric motor having a vertically extending shaft, a turn-table mounted thereon, a plurality of molds carried by said turn-table, electrical means for heating the said molds and alternate means for heating said molds.

5. A dental machine comprising an electric motor having a vertically extending shaft, a turn-table mounted thereon, a plurality of molds carried by said turn-table, a plurality of heating means for heating said molds, and means adapted to be coupled to the motor for driving extraneous devices.

In testimony whereof I affix my signature.

NUMA ERVIN MORGAN.